Sept. 14, 1948.  W. W. BOES  2,449,199
FILM TANK
Filed July 31, 1946  2 Sheets-Sheet 1

INVENTOR
WALTER W. BOES
BY
Toulmin & Toulmin
ATTORNEYS

Sept. 14, 1948.  W. W. BOES  2,449,199
FILM TANK
Filed July 31, 1946  2 Sheets-Sheet 2
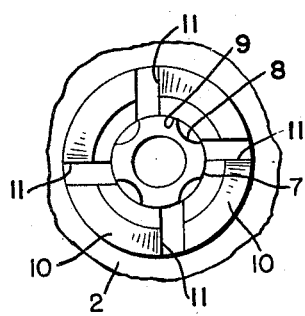
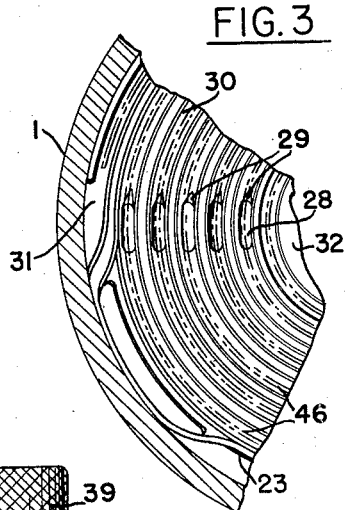
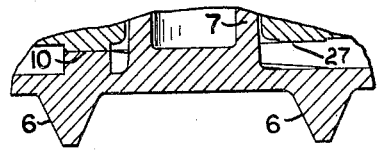
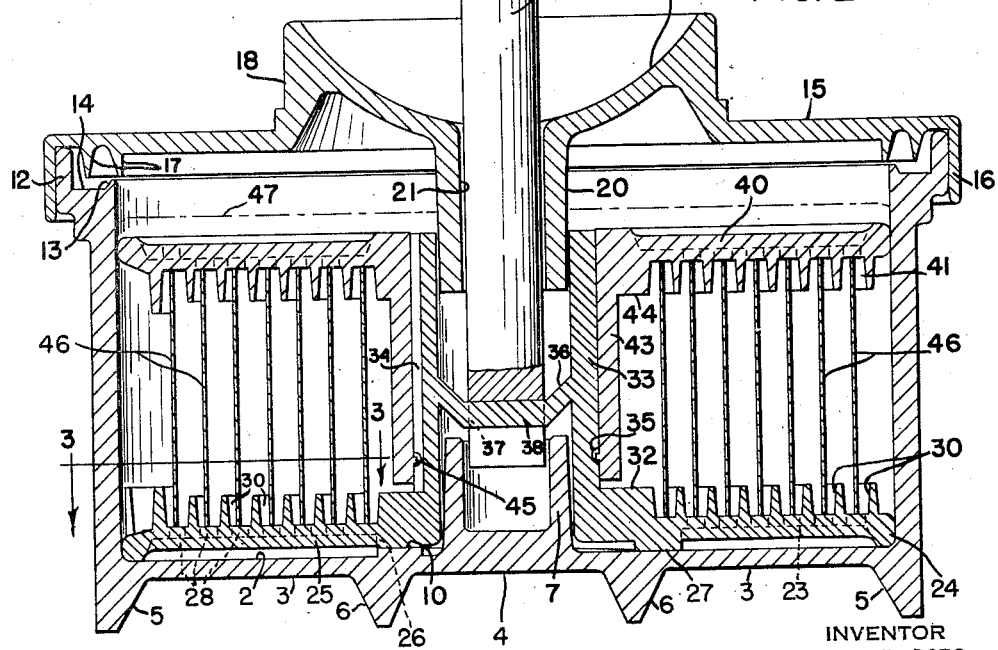
INVENTOR
WALTER W. BOES
BY
Toulmin & Toulmin.
ATTORNEYS Patented Sept. 14, 1948

2,449,199

UNITED STATES PATENT OFFICE 2,449,199

FILM TANK

Walter W. Boes, Dayton, Ohio, assignor to The W. W. Boes Company, Dayton, Ohio, a corporation of Ohio Application July 31, 1946, Serial No. 687,467

2 Claims. (Cl. 95—99.5)

1

The present invention relates to film tanks and more particularly to those of the type in which the film-holding structure is rotated by hand.

Various types of film-developing tanks having a rotating reel have been proposed but they are practically all of expensive construction and in every case, the reel is permitted to rotate in a reverse direction from the direction in which the film is wound on the reel which tends to cause the film to float out of the grooves in the reel. Structure has also been provided for agitating the reel and the wound film longitudinally of the tank but there has been no provision for constraining the reel while being agitated to be rotated in the direction as to maintain the film in its wound condition.

Accordingly, the primary object of the invention is to provide an improved type of film tank including a rotary reel which not only lends itself to being filled with film under dark room conditions but also prevents unwinding and flotation of the film while it is being agitated.

Another object is to provide an improved film tank and reel which are made of simple, inexpensive parts, readily assembled and also which are positively light-proof.

Still another object is to provide an improved film reel for insertion in a tank and in which the film holding elements of the reel are so accurately aligned and properly arranged as to facilitate the insertion and winding of the film on the reel under dark room conditions, preparatory to being placed in the tank.

A further object is to provide an improved film reel for a development tank in which the spools of the reel are so constructed that when the reel is given a bumping action considerable agitation is afforded the developer so as to maintain both sides of the film completely free of air bubbles.

Another object is to provide a film tank and a reel, the reel being constituted of a number of concentric parts in such a positive manner so as to avoid any confusion in arranging the parts to receive the film in the dark room and in inserting the film-filled reel in the developer.

Other objects and features will be apparent as the specification is perused in connection with the accompanying drawings, in which:

Figure 2 is a longitudinal sectional view of the tank and reel with the film in place, the actuating element for the reel being shown in elevation.

Figure 3 is a fragmentary sectional view taken along line 3—3 in Figure 2.

Figure 4 is also a fragmentary sectional view showing the parts constituting the lower inside annular structure forming part of the reel and the tank elements.

Figure 5 is a fragmentary plan view looking down on the cam surfaces which are employed for bumping the reel and also for preventing the latter from turning in a reverse direction.

Figure 1:
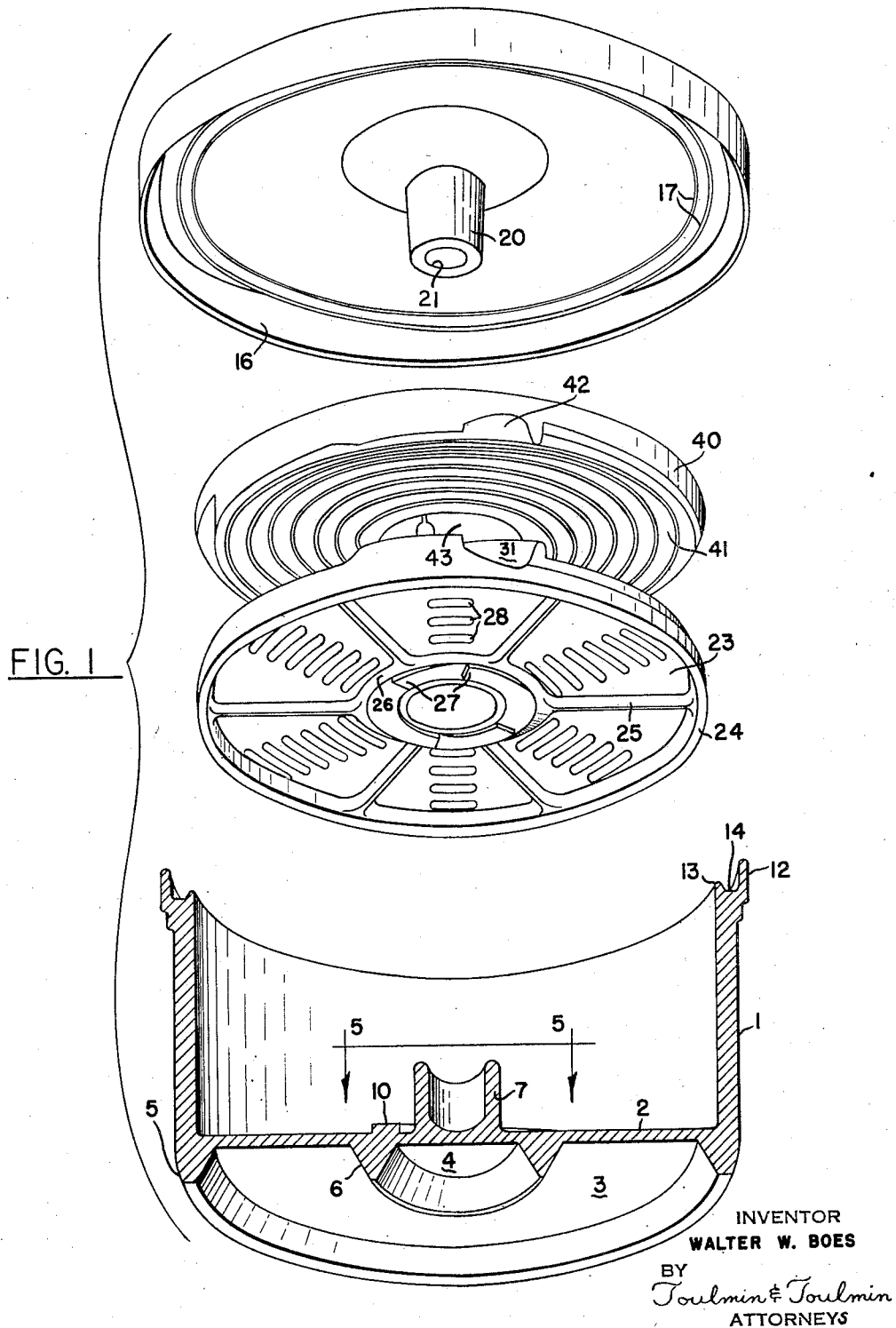
Figure 1 shows the essential parts of the film tank and reel ready to be assembled. The parts are shown in perspective except that the tank has been cut away to illustrate the edge section.

Referring more particularly to Figure 1, reference character 1 designates a circular tank which may be made of metal such as aluminum, or constituted of plastic material or any other suitable substance. The bottom member 2 of the tank is provided with an external annular recess 3 and a circular recess 4 to leave a pair of spaced flanges 5, 6 for lending stability to the tank when positioned on a flat surface. Extending upwardly from the base portions 2 and at the center there is a short tubular member 7, preferably formed integral with the base portion and having, if desired, cut-away recesses 8 so as to leave bearing surfaces 9 of restricted area (Figure 5). Surrounding the element 7 and spaced therefrom there are a plurality (four, as illustrated) of cam surfaces 10, these surfaces being formed as segments and each tapering upwardly in sequence to leave an appreciable shoulder, as indicated at 11 (Fig. 5). These cam portions can be formed integral with the bottom element 2, if desired, and their purpose will be explained hereinafter.

The upper and open edge of the tank 1 is provided with an outwardly and upwardly extending circular lip 12 and an inner lip 13 so as to leave a circular groove 14 therebetween. The cover for the tank is shown in the uppermost view of Figure 1. This cover has a flat circular portion 15 provided at the circumferential edge with a depending flange member 16 which is snugly but slidably received by the outer surface of the flange element 12. A pair of circular ridges 17 may be provided at the under surface of the cover plate 15 directly above the lip 13, the purpose of which is to strengthen the cover in the lateral direction. An upstanding bowl 18 is provided at the top surface of the cover, this bowl having a partial spherical recess 19 which serves as a pouring funnel for the developer.

Extending downwardly from the bowl member at the center there is a flange 20 having an opening 21 for loosely receiving an actuator rod 22. The flange 20 and the upstanding tubular member 7 preferably have the same diameter. The reel is constituted essentially of only two parts so as readily to be assembled together preparatory to winding the film thereon. The lower part is formed of a circular plate 23, flanged at 24 and provided with radially extending ribs 25 for strengthening purposes. These ribs radiate from a circular boss 26, the lower surface of which is provided with tapering cam surfaces, indicated at 27, complemental of the cam surfaces 10 on the bottom plate of the film tank. There is a plurality of elongated slots 28 positioned between each set of ribs 25, these slots having preferably an arcuate configuration and extending peripherally about the plate 23. Each group of slots as a whole extend radially across the plate.

As shown in Figure 3, each slot 28 is provided with a tapered edge 29 across the width of the slot and to the right of each slot as seen looking down on the plate member 23. The purpose of these tapered edges will be explained when the operation of the device is described. On the upper side of the plate 23, there is provided a spiral groove 30 which winds itself toward the center of the plate in a clockwise direction, looking down on the plate, the grooves of the spiral coinciding with the slots 28 so that the latter are each contained in the respective grooves. The entrance to the grooved spiral is indicated at 21 (Fig. 3) and the spiral terminates at the circular boss 32 formed at the center of the plate 23. This boss constitutes part of an upstanding tubular member 33 which has a longitudinal groove 34 and an annular groove 35 near the boss 32.

The tubular member 33 is provided with an internal annular ring 36 tapering downwardly and having an opening 37 which is spanned by a small rectangular rod 38. This rod is adapted to be received in a slot provided at the end of the actuator rod 22 and the latter is knurled as indicated at 39 so as to be grasped between the fingers and rotated. It is obvious that as the rod is turned the bottom plate 23 of the reel is also turned. It will be further observed that as this plate is rotated preferably in the counterclockwise direction (assuming that the spiral grooves 30 tighten inwardly in the clockwise direction), the plate will be caused to move upwardly over a short angular distance. The tapered surfaces of the cams 27 move along the ascending portions of the cams 10 until the shoulders or jogs 11 are reached at which time the plate 23 will drop a short distance downwardly. Thus, by moving this plate in the counterclockwise direction by turning the rod 22, an up-and-down action is created on the plate 23 which is known in the film developing art as a "bumping" operation. The purpose of this operation will be explained further hereinafter.

It will be further noted that due to the fact that the cams 27 and 10 are provided with shoulders, if it were attempted to rotate the reel plate 23 clockwise, these shoulders would abut one another to restrain such rotation so that it is possible to turn the plate 23 in only one direction simultaneously with obtaining the bumping action referred to hereinbefore. The advantage of this unidirectional rotation of the reel plate will be explained hereinafter.

The upper reel plate indicated at 40 is also provided with a series of continuous spiral grooves 41 at its underside, these grooves being cut or formed as to move inwardly while describing a counterclockwise path looking at the underside of the reel plate. Thus, every part of the groove 41 is directly above and corresponds with the respective parts of the groove 30 of the lower reel plate. The entrance to the groove 41 is indicated at 42 (Fig. 1) directly above the entrance 31 in the lower plate. In order to locate the upper reel plate in its proper position with respect to the lower plate so as to keep the grooves in alignment, a tubular member 43 may extend downwardly from the upper reel plate terminating at the top in a boss 44 which receives the inner end of the groove 41. The member 43 may, if desired, be provided with longitudinally extending slots so as to allow a spring action and the internal diameter is such as to snugly but slidably fit over the upright tubular element 33. A longitudinal key extends along the inner bore of the member 43, this key being received by the keyway 34 in the tubular member 33. Thus, the elements 33, 44 are rigidly located in the circumferential direction with respect to one another by this key. For locating these elements in the longitudinal direction a circular ridge 45 extends inwardly from the lower interior surface of the member 43 which ridge is received by the groove 35 in the member 33. The spring action accorded the segmental portions of the member 43 will permit the ridge 45 to snap into the annular keyway 35, thus locating the upper and lower plates of the reel with respect to one another. As shown in Figure 2, the outer diameter of these plates is only slightly less than the internal diameter of the tank 1 so as to provide the minimum play when the reel construction is being rotated by the actuator rod.

When the two reel plates are assembled, usually in a dark room, the film 46 to be developed is introduced at the entrance points 31, 42 and then the reel is fed inwardly to cause the film to move along the successive lengths of the spiral groove, moving inwardly as far as the bosses 32, 44. Inasmuch as the film will tend to unwind within the reel a few points will contact the sides of the groove and therefore hold the film in position between the reel plates. It will be noted in Figure 3 that the lower edge of the film approaches the front edges of the slots 28 and then moves over the slots to the farther edge so that by providing the taper 29 there is complete assurance that the lower corner of the film will not be stopped by the trailing edges of these slots but instead will move quite readily over the taper surfaces. When the film has been placed in position as explained, the assembled reel is mounted within the tank 1 by causing the lower opening of the member 33 to receive the tubular element 7 of the bottom cover. The upper cover or lid 15 of the tank is then placed in position. Developer fluid is then introduced into the circular trough 19, this fluid passing through the opening 21 and the space between the circular elements 7 and 33. Some of the fluid can also pass between the tubular member 20 and the element 33 to fill the spaces above the reel plates 23 and 40 with developer. The fluid finds ready access to both sides of the film 46 through the slots 28.

When it is indicated by observing through the opening 21 that the level of fluid is approximately that indicated by the dot-dash line 47 so as to completely submerge the reel structure, the actuator rod 22 can then be introduced into the opening 21 to engage the rod 38 of the lower reel plate. By turning the rod at the knurled portion 39 in a direction depending on the direction of the spiral grooves 30, 41, for example, counterclockwise as illustrated, the developing fluid is caused to be agitated by the camming action obtained at the lower surface of the lower reel plate. Thus, the developer is caused to flow up-and-down each side of the film including the portion contained within the grooves and to remove any air bubbles that may have collected at the surface of the film and which otherwise might mar the character of the print. During this up-and-down movement of the reel and film, a definite restraint is exercised by the shoulders on the cams to prevent any reverse movement of the reel structure if this structure were moved, for example, in the clockwise direction. The shoulders of the cams would contact one another and prevent further movement. It will be understood that it is desirable for the film in spiral form to be turned in the same direction as the spiral, i. e., to exert a tightening effect, for otherwise the film might become loose, due to flotation within the liquid and deleterious developing effects caused thereby.

It is apparent that the entire reel structure is constituted of only two elements which can be fitted together readily and securely and positively located with respect to one another. Consequently, the lengths of the spiral grooves are directly opposite one another, including the entrance points 31, 42. The various parts of the tank and reel can be most conveniently made out of suitable plastic materials or, if desired, of light metal such as aluminum, in which case the design lends itself almost entirely to easy molding or metal-forming operations. All of the necessary joints between the various parts of the film tank are completely impervious to light when assembled, yet permitting ready movement of the reel structure within the tank in the manner explained hereinbefore.

I am aware that the invention may be embodied in other specific forms without departing from the spirit or essential attributes thereof, and I therefore desire the present embodiment to be considered in all respects as illustrative, and not restrictive; reference being had to the appended claims rather than to the foregoing description to indicate the scope of the invention.

Having thus fully described my invention what I claim as new and desire to secure by Letters Patent is:

1. In a device for developing films, a receptacle, a reel rotatable therein, said reel comprising a pair of oppositely disposed plates provided with grooves which extend toward one another and have a spiral configuration, means for locating the plates with respect to one another both in the longitudinal and peripheral directions, and means for periodically causing the reel to move reciprocably in the longitudinal direction as it is being roated while simultaneously restraining the reel from rotating in the opposite direction, said means comprising segmentally-shaped annular cams tapering in thickness to an abrupt shoulder, one set of cams being positioned on the lower surface of said reel and the other set of cams being positioned on the bottom of said receptacle whereby when said shoulders come into contact on reverse rotation of the reel the movement of the reel in the reverse direction is stopped.

2. In a device for developing films, a receptacle, a reel rotatable in said receptacle comprising a pair of spaced parallel plates provided with grooves which open toward each other and which have a spiral configuration, telescoping hub means on said plates for locating said plates axially, longitudinally and peripherally extending key means on said hubs for locating said plates in the longitudinal and peripheral directions thereof, means for rotating said reel in one direction, and means for periodically causing said reel to reciprocate in its longitudinal direction during the said rotation thereof and for preventing the reel from rotating in the opposite direction, said means comprising a plurality of annularly arranged cams which taper in thickness to an abrupt shoulder, one set of cams being on said reel and another set on said receptacle and being positioned to bear against each other when said reel is in operative position, said shoulders permitting rotation of said reel only in the direction in which said grooves spiral outwardly from said hub means.

WALTER W. BOES.

REFERENCES CITED

The following references are of record in the file of this patent:

UNITED STATES PATENTS

| Number | Name | Date |
| --- | --- | --- |
| 907,890 | Rutenberg | Dec. 29, 1908 |
| 1,916,207 | Francisco | July 4, 1933 |
| 2,112,605 | Pless | Mar. 29, 1935 |
| 2,168,846 | Parker | Aug. 8, 1938 |
| 2,190,754 | Carleton | Feb. 20, 1940 |
| 2,345,682 | Neuwirth | Apr. 4, 1944 |